United States Patent
Polkinghorne

(10) Patent No.: US 6,364,247 B1
(45) Date of Patent: Apr. 2, 2002

(54) PNEUMATIC FLOTATION DEVICE FOR CONTINUOUS WEB PROCESSING AND METHOD OF MAKING THE PNEUMATIC FLOTATION DEVICE

(76) Inventor: David T. Polkinghorne, 21253 N. Woodland Ave., Barrington, IL (US) 60010

( * ) Notice: Subject to any disclaimer, the term of this patent is extended or adjusted under 35 U.S.C. 154(b) by 0 days.

(21) Appl. No.: 09/494,819

(22) Filed: Jan. 31, 2000

(51) Int. Cl.$^7$ ................................................ G03B 1/52
(52) U.S. Cl. .......................... 242/615.11; 242/364.11; 242/908; 205/93; 205/109; 205/114
(58) Field of Search ................. 242/364.11, 615.11, 242/908; 205/80, 93, 109, 112, 114, 261, 271

(56) References Cited

U.S. PATENT DOCUMENTS

| | | |
|---|---|---|
| 1,003,659 A | 9/1911 | Root |
| 1,242,695 A | 10/1917 | Hood |
| 1,323,167 A | 11/1919 | Denny |
| 2,074,281 A * | 3/1937 | Sommer ...................... 91/12.2 |
| 2,409,295 A * | 10/1946 | Marvin et al. ................. 117/99 |
| 2,662,852 A | 12/1953 | Teal |
| 2,781,549 A | 2/1957 | Milne |
| 3,471,338 A | 10/1969 | Trachtenberg |
| 3,505,180 A | 4/1970 | Brogden |
| 3,540,988 A | 11/1970 | Wells et al. |
| 3,567,093 A * | 3/1971 | Johnson ........................ 226/97 |
| 3,632,030 A | 1/1972 | Cohn et al. |
| 3,633,281 A | 1/1972 | Vits |
| 3,655,530 A | 4/1972 | Taylor |
| 3,678,599 A | 7/1972 | Vits |
| 3,680,223 A | 8/1972 | Vits |
| 3,737,091 A | 6/1973 | Barta et al. |
| 3,744,693 A * | 7/1973 | Greiner ........................ 226/97 |
| 3,759,799 A | 9/1973 | Reinke |

(List continued on next page.)

*Primary Examiner*—Christopher P. Ellis
*Assistant Examiner*—Mark J. Beauchaine
(74) *Attorney, Agent, or Firm*—Bell, Boyd & Lloyd LLC

(57) ABSTRACT

The present invention provides a pneumatic flotation device for use in a continuous web processing system for continuously processing paper and other flexible materials and a method of making the pneumatic flotation device. The pneumatic floatation device replaces the rolls, idlers and air bars currently used in continuous processing systems. The pneumatic floatation device includes a microporous sheet attached to a suitable pneumatic support structure. The microporous sheet has a smooth exterior layer with regularly spaced pores that enables air to pass therethrough. The interior layer of the sheet is an open structure metal fabric that enables air to move freely along two axes of the sheet parallel to the exterior layer while in contact with the pneumatic support structure. In one preferred embodiment, the pneumatic support structure includes a rigid tube and an airflow device in fluid communication with the microporous sheet. All of the pneumatic support structure or a portion thereof may be covered with the microporous sheet forming an air boundary layer. The pneumatic support structure includes holes formed along the structure that enables air to flow through the structure to the microporous sheet.

12 Claims, 3 Drawing Sheets

U.S. PATENT DOCUMENTS

| | | |
|---|---|---|
| 3,763,571 A | 10/1973 | Vits |
| 3,771,236 A | 11/1973 | Candor et al. |
| 3,771,239 A | 11/1973 | Minoda et al. |
| 3,807,056 A | 4/1974 | Norfolk |
| 3,823,488 A | 7/1974 | Houben et al. |
| 3,862,018 A | 1/1975 | Mentone |
| 3,892,612 A | 7/1975 | Carlson et al. |
| 3,912,186 A | 10/1975 | Bruck et al. |
| 3,957,187 A | 5/1976 | Puigrodon |
| 4,017,078 A | 4/1977 | Goldfarb et al. |
| 4,021,931 A | 5/1977 | Russ et al. |
| 4,039,397 A | 8/1977 | Klemm |
| 4,045,303 A | 8/1977 | Campbell |
| 4,058,456 A | 11/1977 | Head |
| 4,059,241 A | 11/1977 | De Roeck et al. |
| 4,137,644 A | 2/1979 | Karlsson |
| 4,138,047 A | 2/1979 | Sherman |
| 4,165,132 A | 8/1979 | Hassen et al. |
| 4,173,341 A | 11/1979 | Olliges |
| 4,200,211 A | 4/1980 | Yamagishi et al. |
| 4,204,918 A | 5/1980 | McIntyre et al. |
| 4,218,833 A | 8/1980 | Coar |
| 4,275,655 A | 6/1981 | Artaud et al. |
| 4,282,998 A | 8/1981 | Peekna |
| 4,305,536 A | 12/1981 | Burdorf et al. |
| 4,416,201 A * | 11/1983 | Kessler ...................... 101/348 |
| 4,453,465 A | 6/1984 | Heller et al. |
| 4,454,733 A * | 6/1984 | Fukuroi ...................... 68/198 |
| 4,472,888 A | 9/1984 | Spiller |
| 4,785,986 A | 11/1988 | Daane et al. |
| 4,824,002 A | 4/1989 | Ford et al. |
| 4,833,794 A | 5/1989 | Stibbe et al. |
| 5,088,047 A | 2/1992 | Bynum |
| 5,167,776 A | 12/1992 | Bhaskar et al. |
| 5,194,877 A | 3/1993 | Lam et al. |
| 5,233,919 A | 8/1993 | Fecteau et al. |
| 5,260,539 A | 11/1993 | Reinke |
| 5,290,446 A | 3/1994 | Degen et al. |
| 5,300,165 A | 4/1994 | Sugikawa |
| 5,317,817 A | 6/1994 | Roberts et al. |
| 5,400,709 A | 3/1995 | Drilling et al. |
| 5,423,468 A * | 6/1995 | Liedtke ...................... 226/97 |
| 5,453,173 A | 9/1995 | Oyama |
| 5,478,372 A | 12/1995 | Stark |
| 5,506,047 A | 4/1996 | Hedrick et al. |
| 5,520,317 A | 5/1996 | Eckert et al. |
| 5,558,263 A | 9/1996 | Long |
| 5,570,831 A | 11/1996 | Takeda et al. |
| 5,664,628 A | 9/1997 | Koehler et al. |
| 5,700,363 A | 12/1997 | Ettel et al. |
| 5,728,284 A | 3/1998 | Oyama |
| 5,865,926 A | 2/1999 | Wu et al. |
| 5,935,370 A | 8/1999 | Weimer et al. |
| 5,957,360 A * | 9/1999 | Helinski et al. ............ 226/147 |
| 5,976,342 A | 11/1999 | Arndt et al. |

\* cited by examiner

FIG.1 (PRIOR ART)
FIG.2
FIG.3
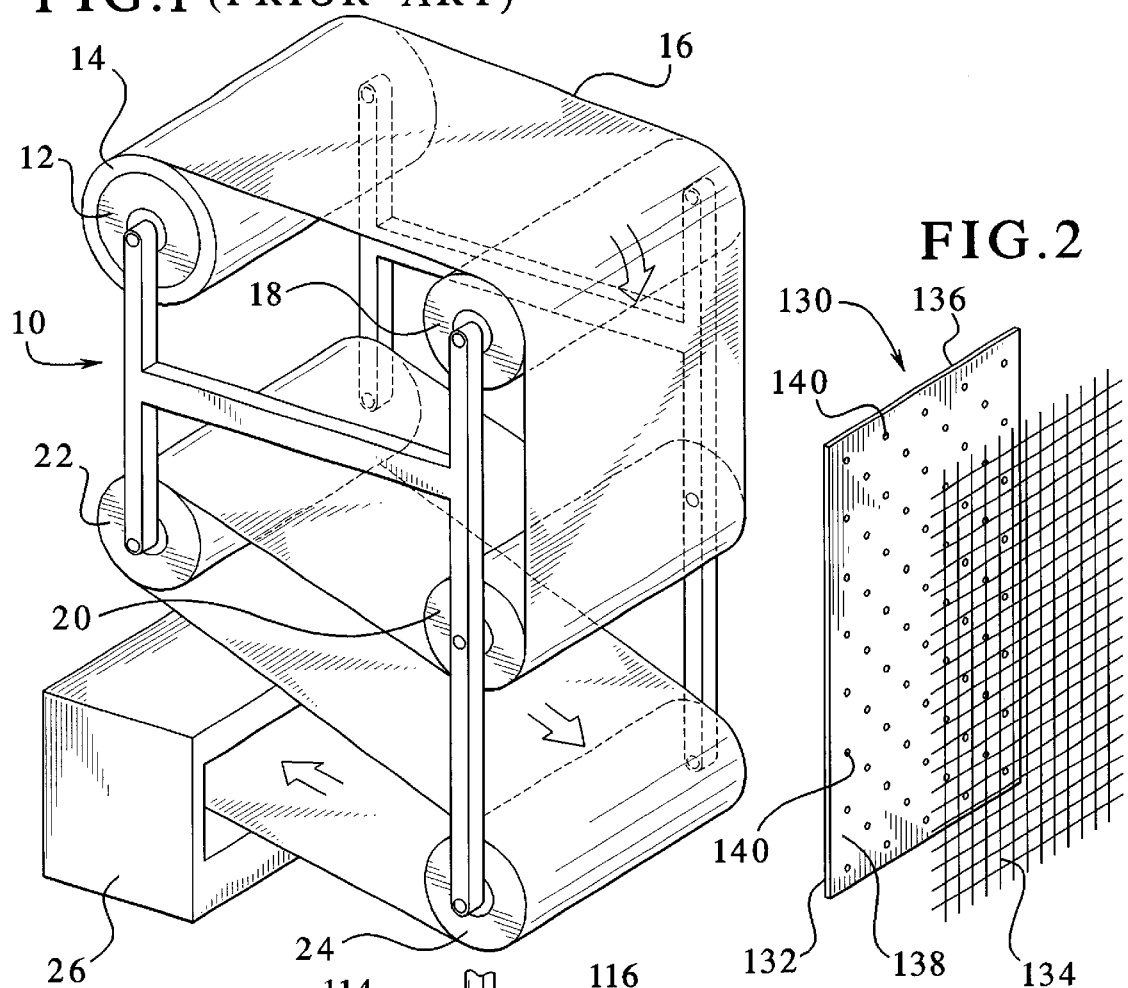
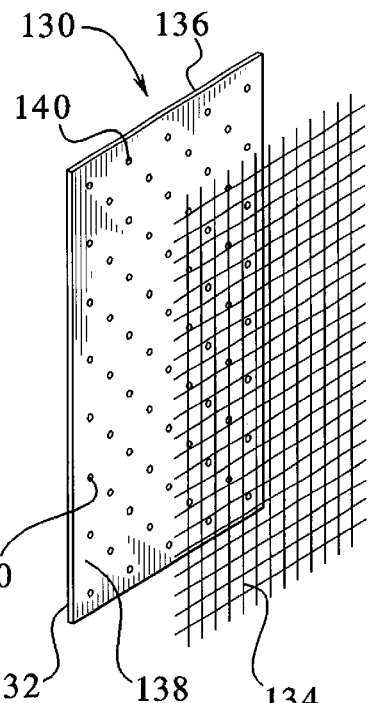
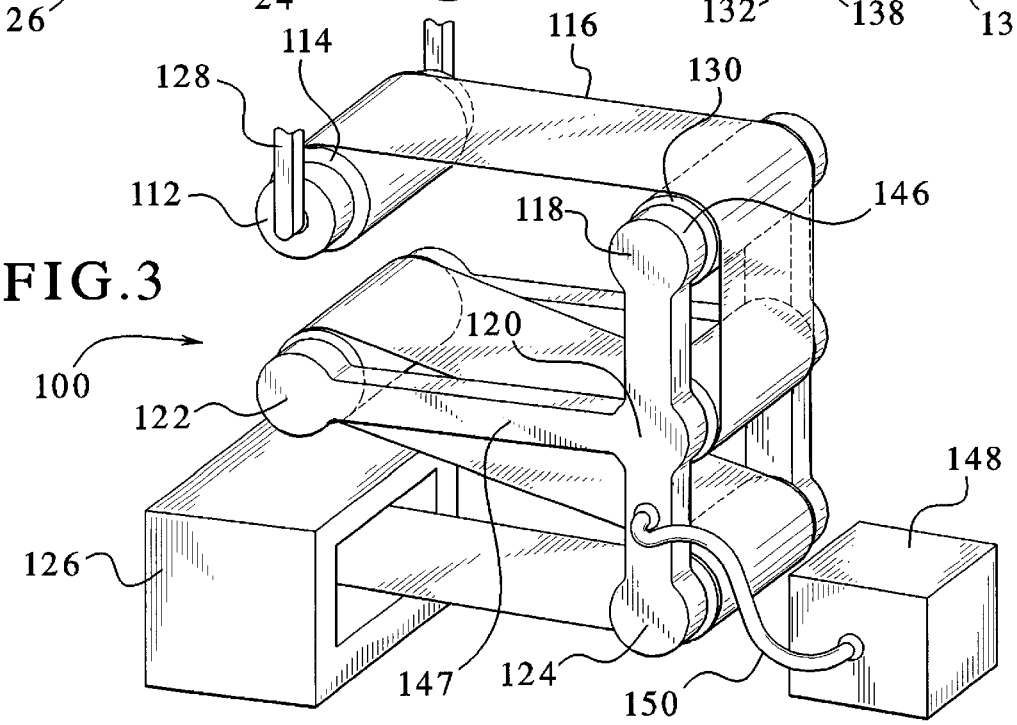

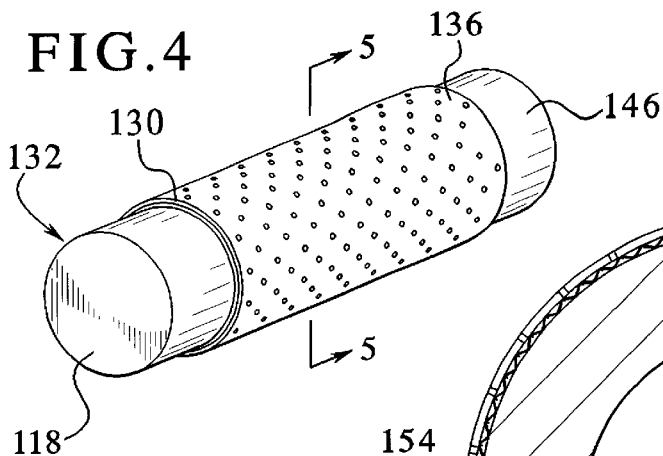

FIG. 4

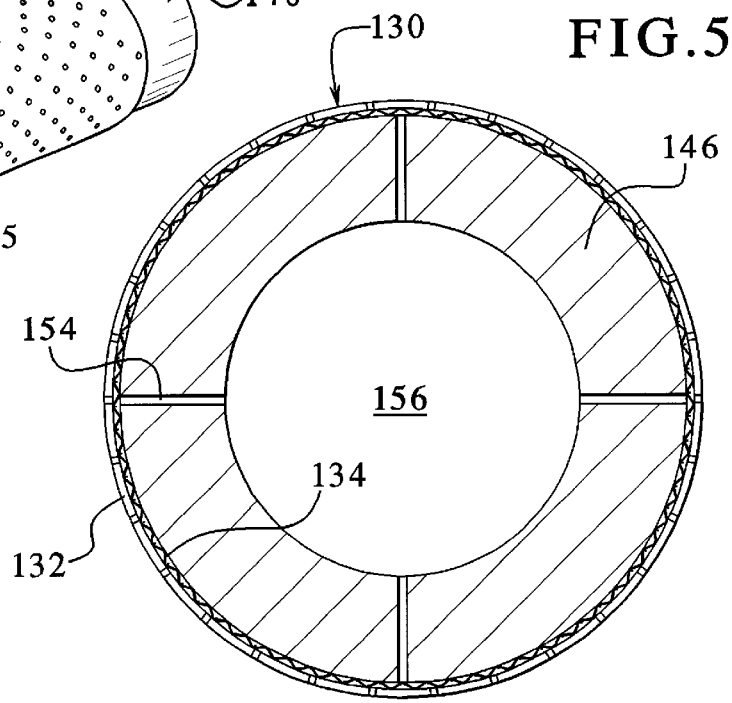

- 158: PREPARE A SUBSTRATE OF A PASSAVATED SURFACE SUITABLE FOR ELECTRO-PLATING.
- 160: CREATE A PLATING MASK CONSISTING OF AN ARRAY OF SMALL PORES.
- 162: ELECTRO-FORM A SHEET OF METAL AND FORM VOIDS IN THE AREA OF THE SMALL PORES.
- 164: WRAP A SHEET OF WIRE CLOTH ONTO THE SHEET OF METAL AND PLATING MASK.
- 166: ELECTRO PLATE THE WIRE CLOTH ONTO THE SHEET OF METAL.
- 169: ATTACH THE MICROPOROUS SHEET ASSEMBLY TO THE SUPPORT STRUCTURE.

PNEUMATIC FLOTATION DEVICE FOR CONTINUOUS WEB PROCESSING AND METHOD OF MAKING THE PNEUMATIC FLOTATION DEVICE

DESCRIPTION

The present invention relates in general to a pneumatic flotation device for use in a continuous web processing system and a method of making the pneumatic flotation device.

BACKGROUND OF THE INVENTION

Numerous types of continuous web processing systems are used to process continuous flexible substrates such as paper, plastics, foils and the like. These systems are used in printing process for newspapers, photographic processes, coating processes, wrapping processes, and the like (individually and collectively referred to herein for brevity as "process" or "processes"). A continuous web processing system is referred to herein alternatively as a "system" or "web system" and the flexible substrate is referred to herein alternatively as the "substrate," "web" or "web material."The scope of the present invention is not intended to be limited by such abbreviations or any other abbreviated terms used to describe the present invention, components, steps or processes thereof.

A conventional web processing system is schematically illustrated in FIG. 1. This system, generally designated numeral 10, includes an unwind mandrel 12 which supports a roll 14 of a web or substrate 16. The substrate 16 is withdrawn from the roll 14 and passes around a number of idle rollers or pulleys 18, 20, 22 and 24 (generally referred to as "idlers") adjacent to a process device 26. In order for the substrate to move predictably through the system, the substrate must be under tension at all times. The process device 26 could be any device for which a continuous web processing system is used such as a rewind mandrel, printer, coater, etc., as is well understood in the art. It should also be appreciated that the various rolls and idlers are mounted to and supported by a frame 28 in the web system 10.

The above-described system 10 is provided for explanatory purposes to present a better understanding of a web system in general, and does not represent any one particular process, nor a specific number of rolls, idlers, etc. The depicted web system 10 generally represents any process involving a substrate or web material under tension, whether in the formation of the material 16 or stretching, winding or preparing the material 16 prior to, during or after printing, coating, etc.

It should also be appreciated that process device 26 in FIG. 1 generally determines the process speed and drives the web system 10. The process device 26 pulls the substrate or web material 16 off roll 14 at a predetermined speed. The roll 18 and idlers 20, 22 and 24 simply guide substrate or web material 16 through the process, rotating in response to the material's 16 passing and directing the material through various processing devices.

Roll 18 and idlers 20, 22 and 24 guide (or steer) the web material 16 through the process prior to, during or after processing in the process device 26. While roll 18 and idlers 20, 22 and 24 do not further the web material 16 through process (i.e., do not add to the process speed), it should be appreciated that these rolls and idlers exert an inertial drag on the web. This can cause the web material 16 to gain tension, thus slowing the process or to tear, stretch or otherwise become unsuitable for subsequent processing or use. Furthermore, as the web material comes in physical contact with the rolls and idlers, imperfections on the rolls or idlers can be transferred to the web material 16 thus damaging the substrate. Rotational friction of the roller or idlers may cause irregular or undesired tension on the substrate.

To avoid these problems, continuous web processing systems have included air bars which support the flexible web material by creating a boundary layer of air. However, such systems use excessive amounts of air due to the practical limit on the minimum size of the holes in the support structure. Moreover, if the web material does not substantially cover the air bar, the air pressure within the tube becomes insufficient to maintain the necessary boundary layer of air and does not support the web. Similarly, porous structural tube are inadequate because they tend to clog with impurities from the air source and cannot be readily and inexpensively cleaned or reconditioned.

Accordingly, there is a need for a continuous web processing system which enables the substrate or web material to pass without interference or damage. In addition, there is a need for a device that enables the web material to pass through the process without destroying the material.

SUMMARY OF THE INVENTION

The apparatus and method of the present invention provides a pneumatic flotation device for use in a continuous web processing system for continuously processing paper and other flexible materials. The pneumatic floatation device of the present invention replaces the rolls and idlers currently used in such processes.

The pneumatic floatation device includes a microporous sheet mounted on, wrapped around or otherwise in contact with a suitable pneumatic support structure. The microporous sheet has a smooth exterior layer with regularly spaced pores which enable air to pass through this layer. The microporous sheet also has an interior layer attached to the interior side of the exterior layer. The interior layer includes an open weave metal fabric, or a pattern or structure of support detents that enables air to move freely along the interior side of the microporous sheet parallel to the exterior surface when the microporous sheet is in contact with the pneumatic support structure.

In one preferred embodiment, the pneumatic support structure includes a rigid tube and an airflow device in fluid communication with the microporous sheet. All or a portion of the support structure is covered with the microporous sheet to form an air boundary layer. The support structure includes spaced apart holes formed along the tube that enable air to flow through the tube to the interior side of the microporous sheet and move freely along the two axes of the sheet.

The invention further includes a method of making the microporous sheet and attaching it to the pneumatic support structure to form the pneumatic floatation device. The method includes: (i) preparing a substrate of a conductive surface suitable for electro-forming; (ii) creating a plating mask consisting of an array of small detents (with an area of 0.0001 inches or less); (iii) electro-forming a sheet of nickel (on the order of 0.002 inches) forming pores, apertures or voids in the areas of the small detents; (iv) wrapping a sheet of wire cloth or fabric onto the sheet of metal and the plating mask; (v) electroplating the wire cloth or fabric onto the sheet of metal; and (vi) attaching the microporous sheet to the support structure.

It is therefore an object of the present invention to provide a pneumatic flotation device for continuous web processing systems.

A further object of the present invention is to provide a method of making a pneumatic floatation device for continuous web processing systems.

A still further objective of the present invention is to provide a pneumatic flotation device that enables a substrate or web material to predictably move through a continuous web processing system without contacting or driving the idlers.

Other objects, features and advantages of the invention will be apparent from the following detailed disclosure, taken in conjunction with the accompanying sheets of drawings, wherein like numerals refer to like parts, components and processes.

BRIEF DESCRIPTION OF THE DRAWINGS

FIG. 1 is a schematic perspective view of a conventional web processing system;

FIG. 2 is an exploded perspective view of a section of the microporous sheet of one embodiment of the pneumatic flotation device of the present invention;

FIG. 3 is a schematic perspective view of a web processing system having a pneumatic support structure employing the pneumatic flotation device of the present invention;

FIG. 4 is a perspective view of a section of the microporous sheet mounted on a pneumatic tube of the present invention;

FIG. 5 is a vertical cross-sectional view taken substantially along line 5—5 of FIG. 4;

FIG. 6 is a block diagram of the method of the present invention for making the microporous sheet of the present invention;

DETAILED DESCRIPTION OF THE INVENTION

Figure 7:
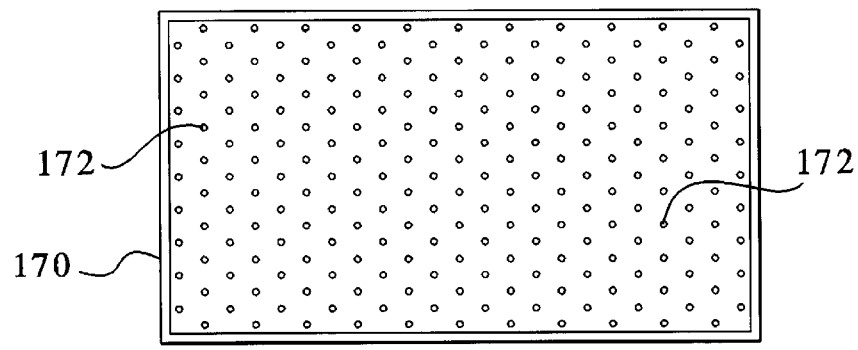
FIG. 7 is a top plan view of the plating mask used in forming the exterior layer of the microporous sheet.
Figure 8:
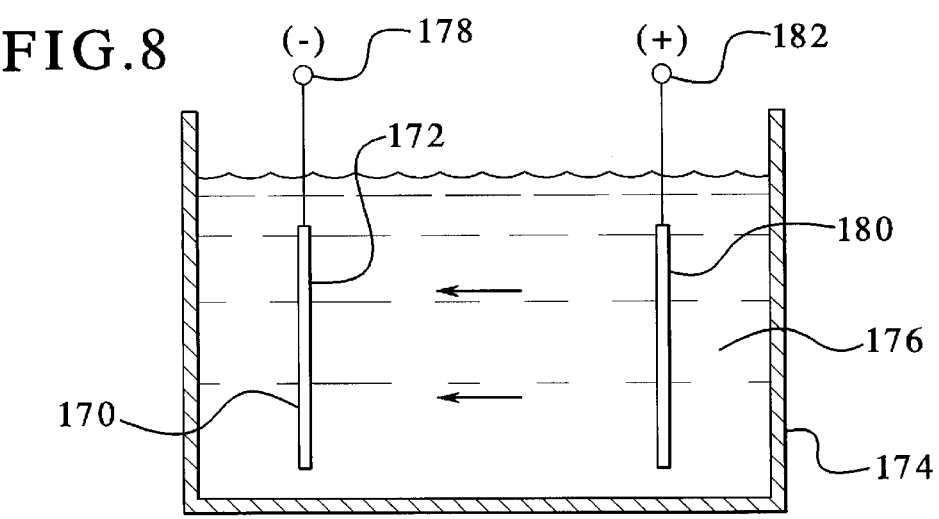
FIG. 8 is a cross-sectional view of the plating tank illustrating the exterior layer.
Figure 9:
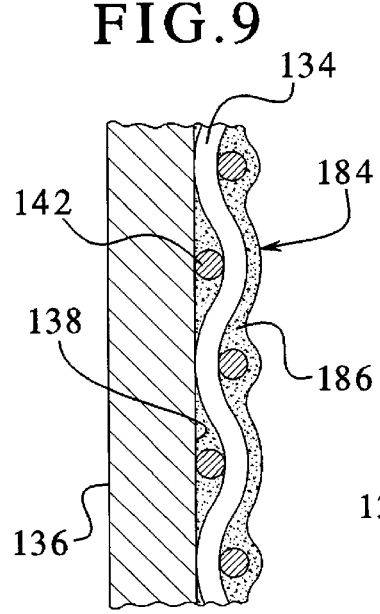
FIG. 9 is a fragmentary vertical cross-sectional view of the wire cloth or fabric interior layer attached to the exterior layer.

The pneumatic flotation device of the present invention generally enables a flexible substrate or web material to move through a continuous web processing system without coming in contact with the flotation device or otherwise inhibiting the process of the flexible material. The pneumatic flotation device replaces the rolls, idlers or air bars currently used in conventional continuous web processing systems.

The pneumatic flotation device includes a microporous sheet illustrated in FIG. 2 and generally designated 130. The microporous sheet 130 includes a microporous exterior outer layer 132 shown in spaced relationship to an interior layer or open weave metal wire cloth or fabric 134. Microporous layer 132 is preferably formed of a suitable metal such as nickel with a smooth exterior surface 136 (not shown in FIG. 2) and an interior surface 138. The exterior surface 136 is preferably smooth to limit any dissipation of the air boundary layer on the surface of the microporous layer 132. Microporous exterior layer 132 preferably has a thickness of approximately 0.002 inches. Microporous exterior layer 132 further defines a plurality of regularly spaced pores, voids or apertures 140, each of which having an area greater than 0.000square inches, less than approximately 0.00001 square inches and preferably approximately 0.000001 square inches. The voids enable air to pass through exterior layer 132. It should be appreciated that the size of the pores controls the volume of air which passes through the exterior layer. The size of the pores may thus need to be varied depending on the porosity of the flexible substrate or web. The relative sizes of the pores will increase as the porosity of the substrate or web increases. It should appreciated that the microporous sheet limits the volume of air that flows though its outer surface and thus creates the desired air boundary layer.

The fabric 134 is a conventional metal woven screen or open mesh material as illustrated in FIG. 2 and may be any desired mesh size, such as 40 to 165 threads to the inch of mesh. Fabric 134 has two sides. One side faces and contacts interior surface 138 of the microporous exterior layer 132, such that the microporous sheet 130 is formed as a single unit comprised of two layers (i.e., a microporous layer and an open mesh layer). The fabric 134 enables air to move freely along two axes of and parallel to the exterior layer 132 while in contact with a pneumatic support structure. The regular spaced pores 140 enable air to pass through the microporous exterior layer 132, forming an air boundary layer that supports a flexible material or web. The microporous layer also maintains the air pressure in the support structure without regard to the width of the web material it supports.

A web system 100 incorporating the present invention is illustrated in FIG. 3. The web system 100 includes an unwind mandrel 112 which supports a roll 114 of web material 116. In this embodiment, frame 128 supports unwind mandrel 112. The system 100 withdraws the web material 116 from roll 114, and passes it around a number of pneumatic floatation devices idlers 118, 120, 122 and 124 before it is received by process device 126. As mentioned above, it is contemplated that process device 126 could be any device for which a continuous web processing system is employed.

The system 100 of FIG. 3 differs from the system of FIG. 1 in that pneumatic floatation devices 118, 120, 122 and 124 are not idle rollers supported by a frame. The pneumatic flotation devices such as device 118, (best viewed in FIGS. 4 and 5) includes pneumatic support structure 146, preferably tubing connected to an air source 148 (here by hose 150). The microporous sheet is mounted or attached to the appropriate portions of the pneumatic support structure. The pneumatic flotation device 118 creates a boundary layer of air that enables the web material 116 to move through the web processing system 100 without contacting the microporous sheet 130 or otherwise inhibiting the process of the flexible material 116. The pneumatic flotation device 118 replaces the rolls, idlers and air bars currently used in the continuous web processing systems. The air source 148 may be a conventional pump or other air generating device connected to the support structure 147.

A section of the pneumatic support structure 146 of the pneumatic flotation device 118 is further illustrated in FIGS. 4 and 5. The microporous sheet 130 is mounted on, wrapped around or is otherwise in contact with support structure 146 so that the exterior surface 136 of the exterior layer 132 of the microporous sheet 130 faces outward. An adhesive, resistive weld, clamping system or the like can be used to mount or connect the microporous sheet 130 to the pneumatic support structure 146. The microporous sheet preferably covers the entire pneumatic support structure 146 or only those portions that come in close proximity to the substrate or web material 116 as it passes through the system 100.

FIGS. 4 and 5 further illustrate that support structure 146 is, in one preferred embodiment a tube defining a plurality of regularly spaced holes 154 (not shown in FIG. 4) fluidly communicating with lumen 156. The tube 152 preferably includes holes (not shown) under the microporous sheet approximately 0.125 inches in diameter and spaced 1.00 inches apart on center. It is contemplated that holes can be regularly spaced about the entire support structure 146 or only in proximity to the microporous sheet 130. As is well understood, positioning holes at certain places in the tube will reduce the amount of air required from any single hole to supply the microporous layer which forms the air boundary layer.

FIG. 5 reveals that holes 154 fluidly communicate with both the lumen 156 and the microporous sheet 130, enabling air to pass through the support structure 146 to the fabric 134 of the pneumatic flotation device. The air moves freely along the two axes of the pneumatic flotation device and out pores 140 forming an air boundary layer as discussed previously.

Referring now to FIGS. 6, 7, 8, 9 and 10, the present invention includes a method 101 of making the pneumatic flotation device of the present invention. The method 101 generally includes: (i) preparing a substrate of a passavated conductive service suitable for electro-forming; (ii) creating a plating mask consisting of an array of small detents; (iii) electro-forming a sheet of metal and forming pores in the areas of small detents (i.e., the microporous sheet 130); (iv) wrapping a sheet of wire cloth onto the plating mask; (v) electroplating the wire (i.e., fabric 134) onto the sheet of metal; and (vi) attaching the microporous sheet 130 to the pneumatic tube or the pneumatic support structure.

Preparing the Substrate (Step 1)

The method 101 includes preparing a substrate of a conductive surface which is suitable for electro-forming (and removing) as indicated by block 158. In the preferred embodiment, the conductive surface is a passavated conductive surface. Although not shown, in one preferred embodiment, the substrate is preferably a stainless steel mandrel.

Creating a Plating Mask (Step 2)

The next step in the method 101 of forming the microporous sheet 130 is creating a plating mask 170 consisting of a regularly spaced array of small nonconducting detents 172 (shown in FIG. 7), as indicated by block 160. In one embodiment, the small detents 172 have an area anywhere in a range greater than approximately 0.000 square inches and less approximately 0.00001 square inches. In one preferred embodiment, the array of small detents 172 have an area of approximately 0.000001 inches.

Electro-Forming a Microporous Sheet of Material (Step 3)

Referring again to FIG. 6, the next step of the method 101 includes electro-forming a sheet of microporous metal material (i.e., microporous outer layer 132) as indicated by block 162. In one contemplated embodiment revealed in FIG. 8, electro-forming the microporous outer layer 130 comprises electrically coupling plating mask 170 to the cathode contacts 178 of a typical rectifier (not shown) and immersing the plating mask 170 in a plating tank 174 with a suitable electrolyte 176. The electro-forming process further includes electrically coupling bars 180 of any suitable metal and immersing the bars 180 in the electrolyte 176. An electric current is applied and a suitable metal is electro-deposited on the plating mask 170 forming pores 140 around detents 172.

In one contemplated embodiment, the method 101 electro-forms a sheet of microporous nickel. In this embodiment, the method 101 includes electrically coupling plating mask 170 to the cathode contacts 178 of the rectifier (not shown) and immersing it in plating tank 174 with a nickel sulfamate electrolyte 176. The method 101 further includes coupling a plurality of nickel bars 180 to the anode 182 and immersing the bars in the electrolyte 176.

The duration of the electro-forming process determines the thickness of the microporous metal exterior layer 132. The longer the process, the more material deposited. In one preferred embodiment, the method 101 deposits a metal with a thickness of approximately 0.002 inches on the plating mask 170.

Wrapping a Sheet of Wire Cloth Onto the Plating Mask (Step 4)

Figure 10:
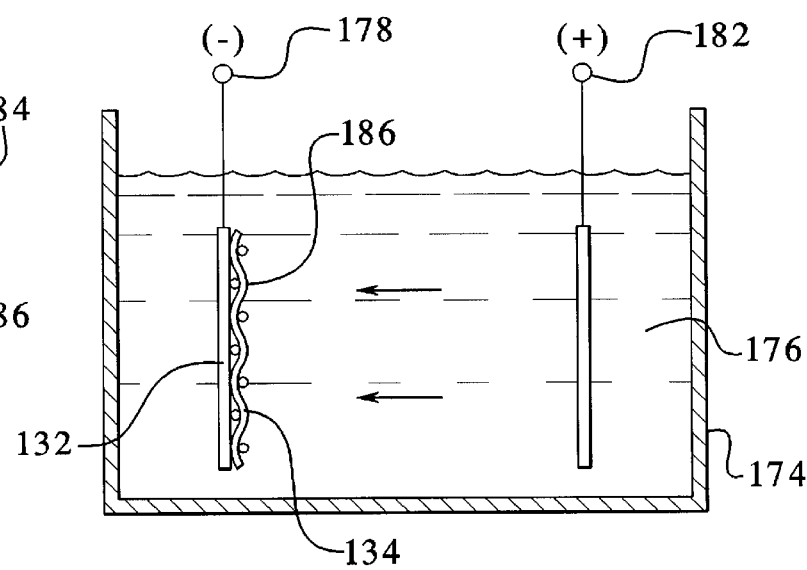
FIG. 10 is a cross-sectional view of the plating tank illustrating the fabric attached to the exterior layer.

FIG. 10 reveals a sheet of wire cloth 184 mechanically contacting and wrapping around the plating mask 170 and the microporous exterior layer 132, as indicated by block 164. In one preferred embodiment, the sheet of wire cloth 184 comprises an open weave metal fabric 134 and cloth backing 186. The sheet of wire cloth 184 contacts the plating mask 170 so that all points of the first side 142 of fabric 134 is in intimate contact with inner surface 138 of microporous exterior layer 132, ensuring suitable electrical conductivity therebetween, ensuring all parts of the fabric 134 are bonded to exterior layer 132.

Electro-Plating the Wire Onto the Sheet of Metal (Step 5)

Method 101 further includes electroplating the fabric 134 onto the microporous exterior layer 132, as indicated by block 166 of FIG. 6. In one contemplated embodiment revealed in FIG. 10, electroplating the fabric 134 to the microporous exterior sheet 132 comprises electrically coupling the combined plating mask 170, microporous exterior layer 132 and wire cloth 184 to the cathode contacts 178 of a typical rectifier (not shown) and immersing it in plating tank 174 with a suitable electrolyte 176. The electroplating process further includes electrically coupling bars 180 of any suitable metal and immersing the bars 180 in the electrolyte 176. The plating process is carried out by directing the plating toward the combined plating mask 170, wire cloth 184 and microporous exterior layer. An electric current is applied to the bars 180 and the combined plating mask 170, wire cloth 184 and exterior layer 132, producing a coating or plating simultaneously on the fabric 134. When the correct plating time lapses, a coating having approximately 0.0005 inch thickness is formed, bonding the fabric 134 to the microporous exterior layer 132. Metal deposits by electrolysis can be accomplished without inducing strains in the plating.

In one contemplated embodiment, the method 101 electro-plates the fabric 134 to a microporous nickel outer layer 132. In this embodiment, the method includes electrically coupling the combined plating mask 170, microporous nickel exterior layer 132 and wire cloth 184 to the cathode contacts 178 of the rectifier (not shown) and immersing It in plating tank 174 with a nickel sulfamate electrolyte 176. The method further includes coupling a plurality of nickel bars to the anode 182, immersing the bars in the nickel sulfamate electrolyte 176 and applying a current to the nickel bars and the combined plating mask 170, microporous exterior layer 132 and wire cloth 184.

It should be appreciated that in an alternative embodiment of the present invention, a plurality of pins could be electro-formed on or attached to the interior surface of the exterior layer to support the exterior layer.

Attaching the Microporous Sheet to the Tube (Step 6)

Method 101 further includes attaching dr contacting the microporous sheet 130 to the tube of the support structure as indicated by block 169. As provided previously, the microporous sheet 130 is mounted on, wrapped around or is otherwise in contact with support structure 146 so that the exterior surface 136 of the microporous sheet 130 faces outward. A suitable adhesive, resistive weld, clamping system or the like can be used to mount or connect the microporous sheet 130 to pneumatic tube or the pneumatic support structure 146, so that it covers the entire tube or support structure 146 or only those portions that come in close proximity to the web material 116 as the web material passes through the web system 100.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention is hereby claimed as follows:

1. A pneumatic floatation device for a continuous web processing system, said pneumatic flotation device comprising;
    a pneumatic support structure; and
    a microporous sheet mounted on the pneumatic support structure, said microporous sheet having an exterior layer defining a plurality of pores which enable air to pass through the exterior layer and an interior layer between the exterior layer and the support structure, said interior layer having an open structure which allows air to move between the exterior layer and the support structure when the microporous sheet is in contact with the pneumatic support structure.

2. The pneumatic flotation device of claim 1, wherein the exterior layer of the microporous sheet has a smooth exterior surface.

3. The pneumatic flotation device of claim 2, wherein the exterior layer of the microporous sheet is metal.

4. The pneumatic flotation device of claim 1, wherein the interior layer of the microporous sheet is an open weave material which supports the exterior layer and enables the air to move along two axes of the microporous sheet parallel to the exterior layer.

5. The pneumatic flotation device of claim 4, wherein the open weave is metal.

6. The pneumatic flotation device of claim 1, wherein the pneumatic support structure includes a pneumatic tube.

7. A method of making a pneumatic flotation device for use in a continuous web processing system, said method comprising the steps of:
    preparing a substrate of a conductive surface suitable for electro-forming;
    creating a plating mask consisting of a plurality of detents;
    electro-forming a sheet of metal and forming pores in said sheet of metal in the areas of said detents;
    wrapping a sheet of wire cloth over said plating mask and said sheet of metal;
    electroplating at least a wire weave of said wire cloth onto said metal sheet;
    removing said electroplated wire weave and metal sheet form said plating mask forming a microporous sheet; and
    attaching said microporous sheet to at least a portion of a support structure of the continuous web processing system.

8. The method of claim 7, wherein said substrate of conductive material suitable for electroforming is a passavated conductive material.

9. The method of claim 8, wherein said plurality of detents each have a diameter of approximately 0.000001 inches.

10. The method of claim 9, wherein said sheet of metal formed in the electro-forming step has a thickness greater than approximately 0.000 inches and less then or equal to approximately 0.003 inches.

11. The method of claim 10, wherein the sheet of metal has a thickness of approximately 0.002 inches.

12. The method of claim 11, wherein said metal sheet formed in said electro-forming step is nickel.

* * * * *